US009729022B2

(12) United States Patent
Akutsu et al.

(10) Patent No.: US 9,729,022 B2
(45) Date of Patent: Aug. 8, 2017

(54) ELECTRIC POWER STEERING DEVICE

(71) Applicant: Mitsubishi Electric Corporation, Tokyo (JP)

(72) Inventors: Satoru Akutsu, Tokyo (JP); Kohei Ushio, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 265 days.

(21) Appl. No.: 14/650,192

(22) PCT Filed: Oct. 24, 2013

(86) PCT No.: PCT/JP2013/078821
§ 371 (c)(1),
(2) Date: Jun. 5, 2015

(87) PCT Pub. No.: WO2014/129013
PCT Pub. Date: Aug. 28, 2014

(65) Prior Publication Data
US 2015/0318753 A1   Nov. 5, 2015

(30) Foreign Application Priority Data
Feb. 20, 2013   (JP) .................... 2013-030989

(51) Int. Cl.
*H02K 11/00*   (2016.01)
*H02K 5/10*   (2006.01)
(Continued)

(52) U.S. Cl.
CPC ............ *H02K 5/10* (2013.01); *B62D 5/0406* (2013.01); *B62D 5/0409* (2013.01);
(Continued)

(58) Field of Classification Search
CPC ...... H02K 11/33; H02K 11/00; B62D 5/0406; B62D 5/0409; B62D 5/0463
(Continued)

(56) References Cited

U.S. PATENT DOCUMENTS 6,386,056 B1 *   5/2002   Bachnak .............. B62D 5/0403
74/425
6,463,829 B2 *   10/2002   Torii ....................... H02K 5/10
74/425
(Continued)

FOREIGN PATENT DOCUMENTS

EP   2251242 A1   11/2010
JP   2006-513906 A   4/2006
(Continued)

OTHER PUBLICATIONS

Communication dated Nov. 4, 2016, from the European Patent Office in counterpart European Application No. 13876060.8.
(Continued)

*Primary Examiner* — Robert W Horn
(74) *Attorney, Agent, or Firm* — Sughrue Mion, PLLC; Richard C. Turner

(57)   ABSTRACT

An electric power steering device (1) according to the present invention includes: a gearbox; and a driving control unit (4) connected to the gearbox through a mounting-portion contact surface (7). The driving control unit (4) includes an outer-diameter gradually increasing surface (11) formed on one end portion thereof, the outer-diameter gradually increasing surface (11) being connected so that an outer diameter thereof on the mounting-portion contact surface (7) matches with an outer diameter of the gearbox. Thus, it is possible to prevent a liquid from entering inside through the mounting-portion contact surface (7), thereby
(Continued)

preventing electrical insulating properties of internal electric components from being lowered.

11 Claims, 10 Drawing Sheets

(51) Int. Cl.
*H02K 7/116* (2006.01)
*B62D 5/04* (2006.01)
*H02K 11/33* (2016.01)

(52) U.S. Cl.
CPC ......... *B62D 5/0463* (2013.01); *H02K 7/1166* (2013.01); *H02K 11/0094* (2013.01); *H02K 11/33* (2016.01)

(58) Field of Classification Search
USPC .......................................................... 310/71
See application file for complete search history.

(56) References Cited

U.S. PATENT DOCUMENTS

| | | | | |
|---|---|---|---|---|
| 6,577,030 | B2* | 6/2003 | Tominaga | B62D 5/0406 310/64 |
| 6,745,865 | B2* | 6/2004 | Hama | H02K 5/148 180/444 |
| 7,183,681 | B2* | 2/2007 | Segawa | B62D 5/0403 310/68 B |
| 7,621,367 | B2* | 11/2009 | Tominaga | B62D 5/0406 180/444 |
| 2004/0163879 | A1 | 8/2004 | Segawa | |
| 2006/0108884 | A1* | 5/2006 | Shiino | B60T 8/267 310/89 |
| 2007/0205038 | A1* | 9/2007 | Tominaga | B62D 5/0406 180/444 |
| 2010/0288577 | A1* | 11/2010 | Sonoda | B62D 5/0406 180/446 |
| 2010/0314192 | A1* | 12/2010 | Nagase | B62D 5/0406 180/444 |
| 2011/0066332 | A1* | 3/2011 | Sonoda | B62D 5/0406 701/42 |
| 2012/0313467 | A1* | 12/2012 | Omae | B62D 5/0406 310/71 |
| 2013/0300235 | A1* | 11/2013 | Akutsu | B62D 5/0406 310/71 |
| 2014/0077638 | A1* | 3/2014 | Nakai | B62D 5/0406 310/71 |
| 2015/0318753 | A1* | 11/2015 | Akutsu | B62D 5/0406 310/71 |

FOREIGN PATENT DOCUMENTS

| | | |
|---|---|---|
| JP | 2009-214860 A | 9/2009 |
| JP | 4816061 B2 | 11/2011 |
| JP | 2012-117649 A | 6/2012 |
| WO | 2012137322 A1 | 10/2012 |

OTHER PUBLICATIONS

JPO Office Action for Application No. 2013-030989 dated Jan. 21, 2014.
International Search Report for PCT/JP2013/078821 dated Jan. 28, 2014 [PCT/ISA/210].

* cited by examiner

ELECTRIC POWER STEERING DEVICE

CROSS REFERENCE TO RELATED APPLICATIONS

This application is a National Stage of International Application No. PCT/JP2013/078821, filed on Oct. 24, 2013, which claims priority from Japanese Patent Application No. 2013-030989, filed on Feb. 20, 2013, the contents of all of which are incorporated herein by reference in their entirety.

TECHNICAL FIELD

The present invention relates to an electric power steering device using a driving force of a motor unit as a steering assist force generation source.

BACKGROUND ART

In a related-art electric power steering device, when an outer diameter of a housing of a motor unit is larger than an outer diameter of a housing of a gearbox, a level difference is generated on a mounting-portion contact surface between the housing of the motor unit and the housing of the gearbox (see, for example, Patent Literature 1).

CITATION LIST

Patent Literature

[PTL 1] JP 4816061 B (page 6 and FIG. 2)

SUMMARY OF INVENTION

Technical Problem

In the related-art electric power steering device disclosed in Patent Literature 1, when the outer diameter of the housing of the motor unit is larger than the outer diameter of the housing of the gearbox, a right-angled level difference portion having a large level difference is generated over an entire circumference of the mounting-portion contact surface.

Therefore, a liquid dropping from above may cause accumulation thereof on the level difference portion, and may not easily flow out. Thus, there is a problem in that the liquid enters inside through the mounting-portion contact surface to lower electrical insulating properties of internal electric components, thereby impairing functions.

The present invention has been made to solve the problem described above, and has an object to provide an electric power steering device that prevents a liquid from entering inside through a mounting-portion contact surface, thereby preventing the electrical insulating properties of the internal electric components from being lowered.

Solution to Problem

According to one embodiment of the present invention, there is provided an electric power steering device, including:

a gearbox; and a driving control unit, which is coaxially connected to the gearbox through a mounting-portion contact surface corresponding to an end surface of the driving control unit, for controlling driving of a motor unit that is a steering assist force generation source, the driving control unit including an outer-diameter gradually increasing surface formed on one end portion thereof, the outer-diameter gradually increasing surface being connected so that an outer diameter thereof on the mounting-portion contact surface matches with an outer diameter of the gearbox and gradually enlarging along an axis direction.

Advantageous Effects of Invention

According to the electric power steering device of the one embodiment of the present invention, the driving control unit includes the outer-diameter gradually increasing surface formed at the one end portion, which is connected so that the outer diameter of the contact surface of the mounting portion coincides with the outer diameter of the gearbox and gradually enlarges along the axis direction. Therefore, a liquid is unlikely to stay on the mounting-portion contact surface. Accordingly, the liquid can be prevented from passing through the mounting-portion contact surface to enter inside, thereby preventing the electrical insulating properties of the internal electric components from being lowered.

DESCRIPTION OF EMBODIMENTS

Figure 1:
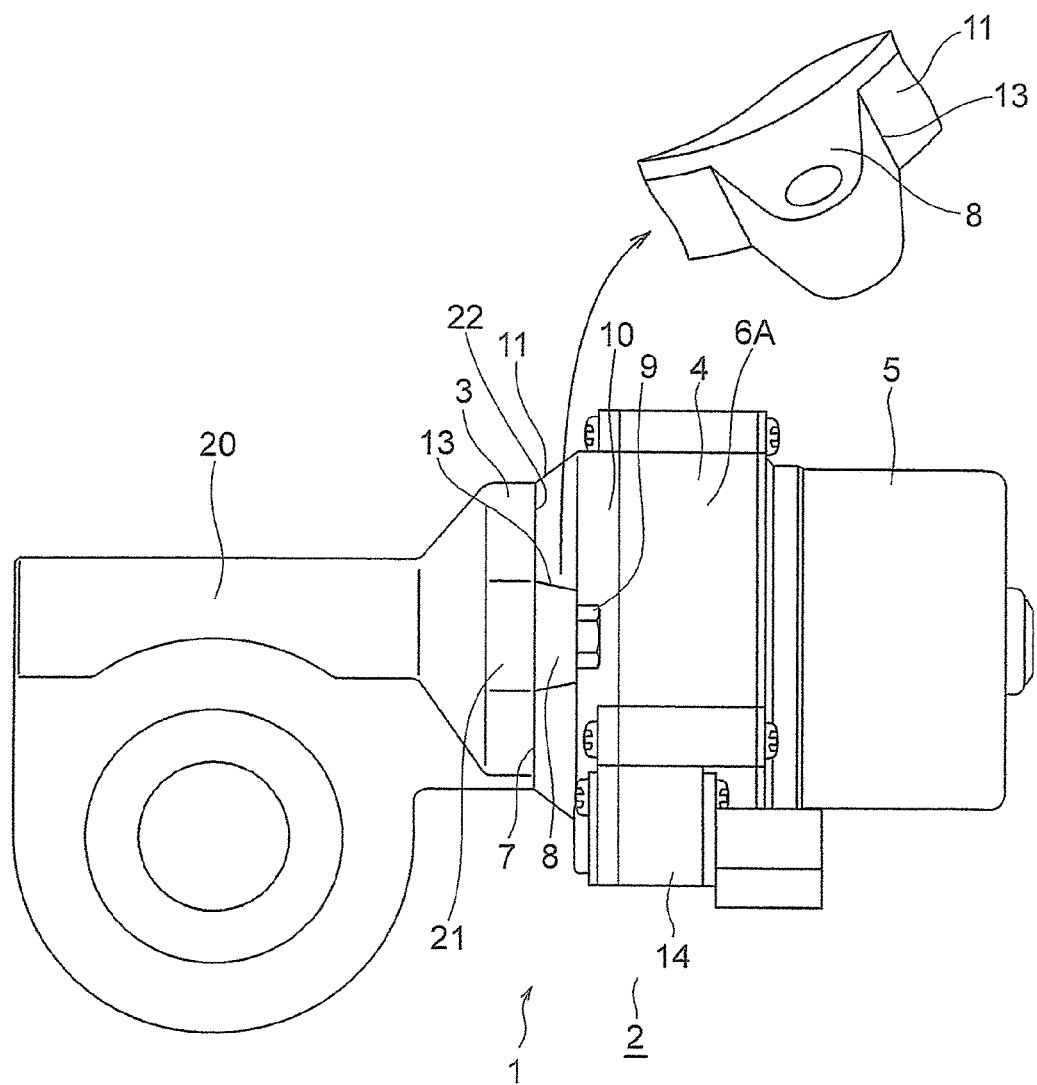
FIG. 1 is a side view illustrating the electric power steering device according to a first embodiment of the present invention.

Referring to the drawings, an electric power steering device 1 according to each of embodiments of the present invention is described below. In the drawings, the same or corresponding members and parts are denoted by the same reference symbols for description.

First Embodiment

Figure 2:
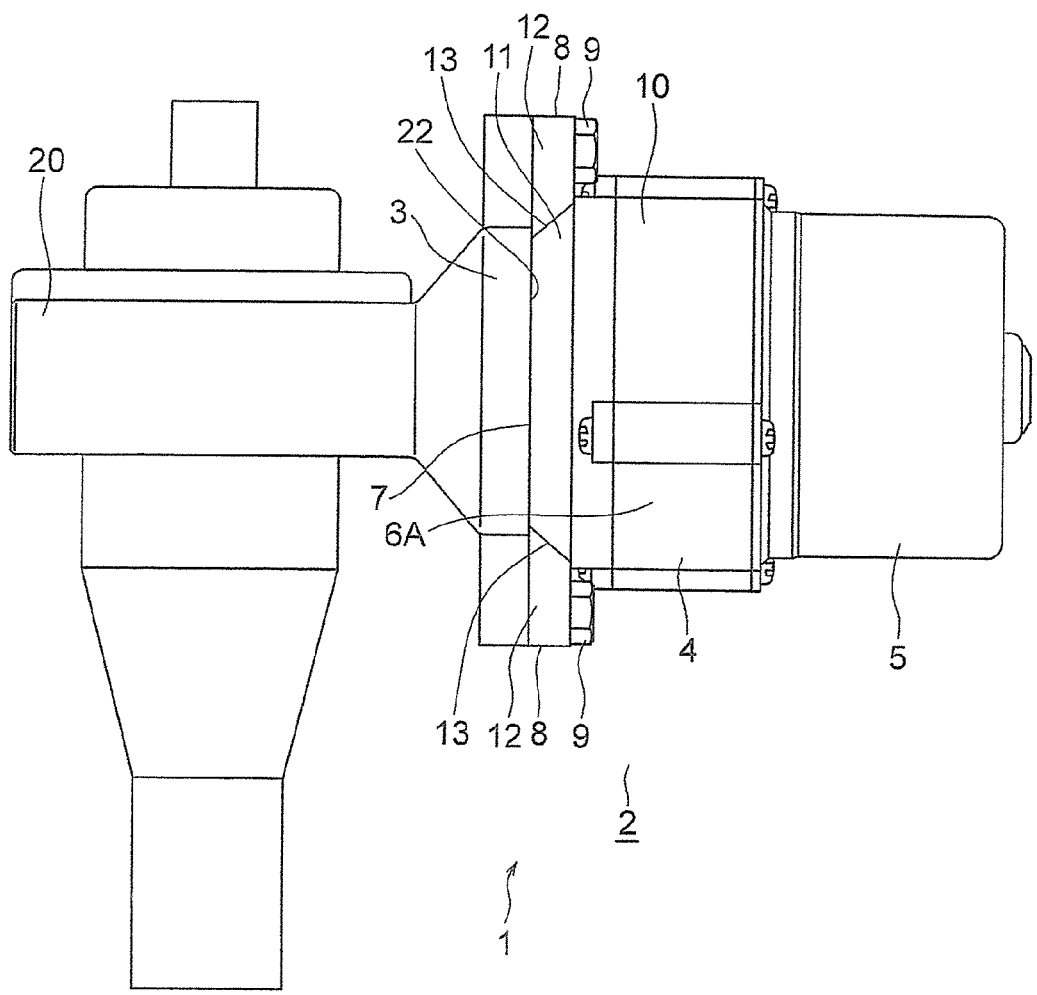
FIG. 2 is a top view of FIG. 1.
Figure 3:
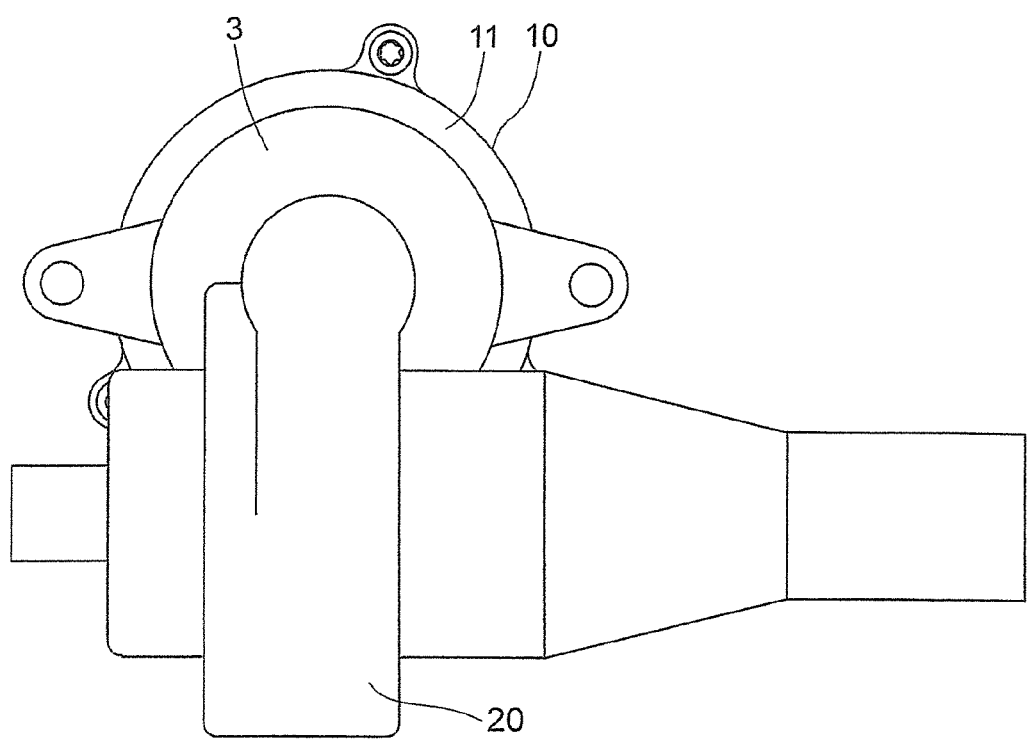
FIG. 3 is a front view of FIG. 1.
Figure 4:
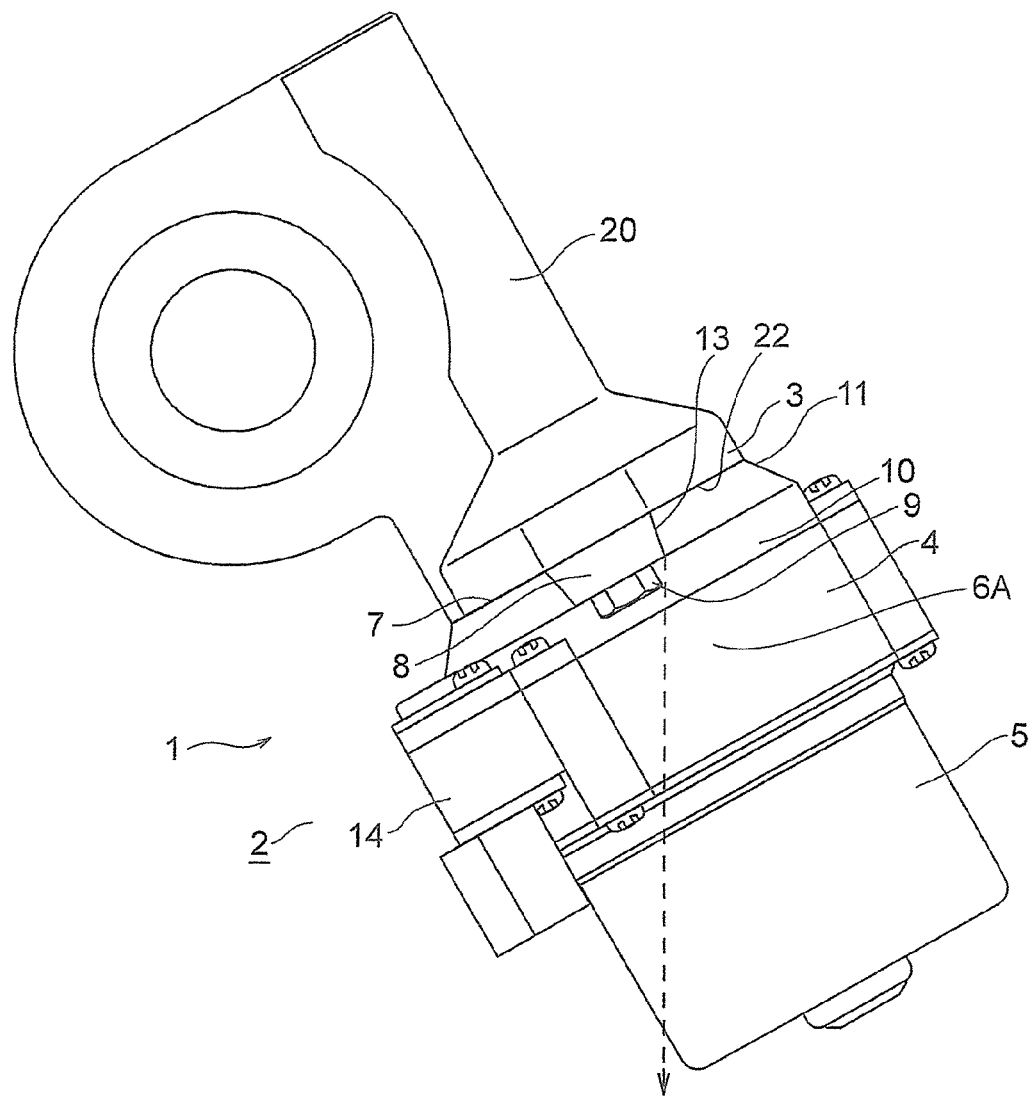
FIG. 4 is a side view illustrating a mounting angle formed when the electric power steering device 1 of FIG. 1 is mounted in a vehicle.

FIG. 1 is a side view illustrating the electric power steering device 1 according to a first embodiment of the present invention. FIG. 2 is a top view of FIG. 1. FIG. 3 is a front view of FIG. 1. FIG. 4 is a side view illustrating a mounting angle formed when the electric power steering device 1 of FIG. 1 is mounted in a vehicle.

In FIGS. 1 to 4, the electric power steering device 1 includes a motor 2 that is a steering assist force generation source, a gearbox in which a speed-reduction gear for reducing a rotation speed of the motor 2 is housed within a gear housing 3 formed by aluminum die casting, and a steering column 20 coupled to the gearbox, which rotatably supports a steering shaft (not shown).

In FIG. 2, a steering wheel is arranged on a lower side of the steering column 20.

The motor 2 includes a permanent magnet synchronous motor unit 5 and a driving control unit 4 arranged coaxially and integrally with the motor unit 5, which controls driving of the motor unit 5.

A pair of mounting flanges 8 is formed on a motor housing 6A formed by aluminum die casting, which forms an outer wall of the motor 2. The mounting flanges 8 are coupled to mounting flanges 21 of the gear housing 3 by mounting screws 9 so that the gearbox and the motor 2 are coupled to each other.

The gear housing 3 and the motor housing 6A also function as a heat sink for the driving control unit 4.

One end portion of the motor housing 6A includes an outer-diameter gradually increasing surface 11 having an outer diameter substantially matching with an outer diameter of the gear housing 3 on a mounting-portion contact surface 7 and gradually enlarges from the mounting-portion contact surface 7 toward a motor-housing outer circumferential surface 10.

Although the outer-diameter gradually increasing surface 11 has a tapered shape, the shape thereof may be a rounded shape enlarging in a radial direction or a shape similar thereto.

In a portion in which a wall surface 12 of each of the mounting flanges 8, which extends in the radial direction, and the outer-diameter gradually increasing surface 11 intersect, an approximately V-like shaped intersection portion 13 is formed.

The driving control unit 4 includes a device-unit main body including a power circuit for allowing a driving current to flow through the motor unit 5 and a control circuit for controlling the driving current, and a connector unit 14 including a power connector for supplying power from the vehicle and a signal connector for receiving and transmitting a signal necessary for the motor unit 5.

As can be seen from FIG. 4, when being mounted in the vehicle, the electric power steering device 1 is mounted so that the mounting flanges 8 are located above the connector unit 14.

Further, the connector unit 14 falls within an orthographic projection area of the motor housing 6A.

Further, the connector unit 14 is located away from a vertical line (indicated by the dotted line in FIG. 4) extended from a lower end of the intersection portion 13.

In a state in which the electric power steering device 1 configured as described above is mounted in the vehicle, a liquid such as rainwater or beverage that drops from above flows down along the outer-diameter gradually increasing surface 11 and the intersection portions 13 to flow out to the outside. Therefore, the liquid does not accumulate on the mounting-portion contact surface 7 between the gear housing 3 and the motor housing 6A and does not flow down to the connector unit 14.

Therefore, the electrical insulating properties of the power circuit and the control circuit included in the driving control unit 4 arranged inside the motor housing 6A are prevented from being lowered so as to prevent functions of the driving control unit 4 from being impaired.

Further, the electric power steering device 1 includes the motor 2 including the driving control unit 4 and the motor unit 5 that are configured integrally. Therefore, a mass of the electric power steering device 1 is large enough to easily generate a gap between the gear housing 3 and the motor housing 6A due to vibrations. The electric power steering device 1 includes the outer-diameter gradually increasing surface 11 on the one end portion of the motor housing 6A, however, adverse effects of the vibrations due to increase in mass can be suppressed.

Further, the driving control unit 4 includes the power circuit and the control circuit arranged around an output shaft of the motor unit 5 and therefore has a large dimension in the radial direction. As a result, a level difference is likely to be generated between the driving control unit 4 and the gearbox, specifically, between the motor housing 6A and the gear housing 3. However, by forming the outer-diameter gradually increasing surface 11 on the one end portion of the motor housing 6A, a great effect of suppressing adverse effects produced due to the level difference is obtained.

In this embodiment, the mounting flanges 8 are used as wall portions, and the wall surfaces 12 of the wall portions correspond to side surfaces of the mounting flanges 8. Alternatively, radially projecting protrusions may be formed on the outer-diameter gradually increasing surface 11 and side surfaces of the protrusions may be used as wall surfaces so that the liquid flows down along intersection portions in which the wall surfaces and the outer-diameter gradually increasing surface 11 intersect.

Second Embodiment

Figure 5:
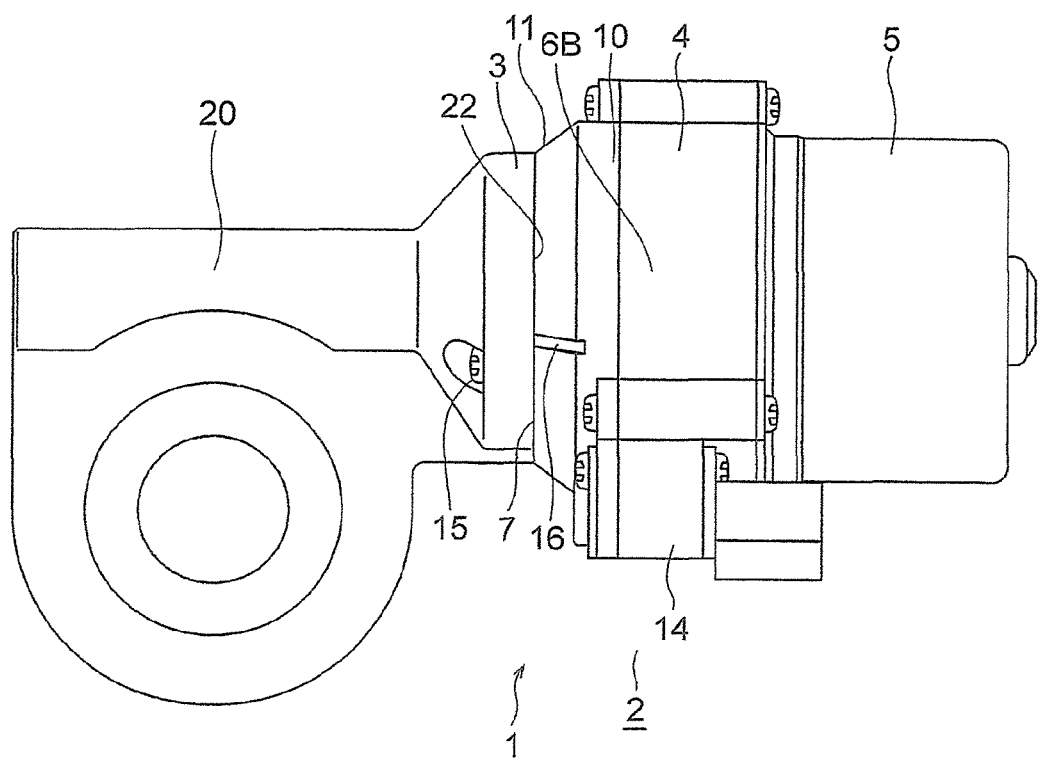
FIG. 5 is a side view illustrating the electric power steering device according to a second embodiment of the present invention.
Figure 6:
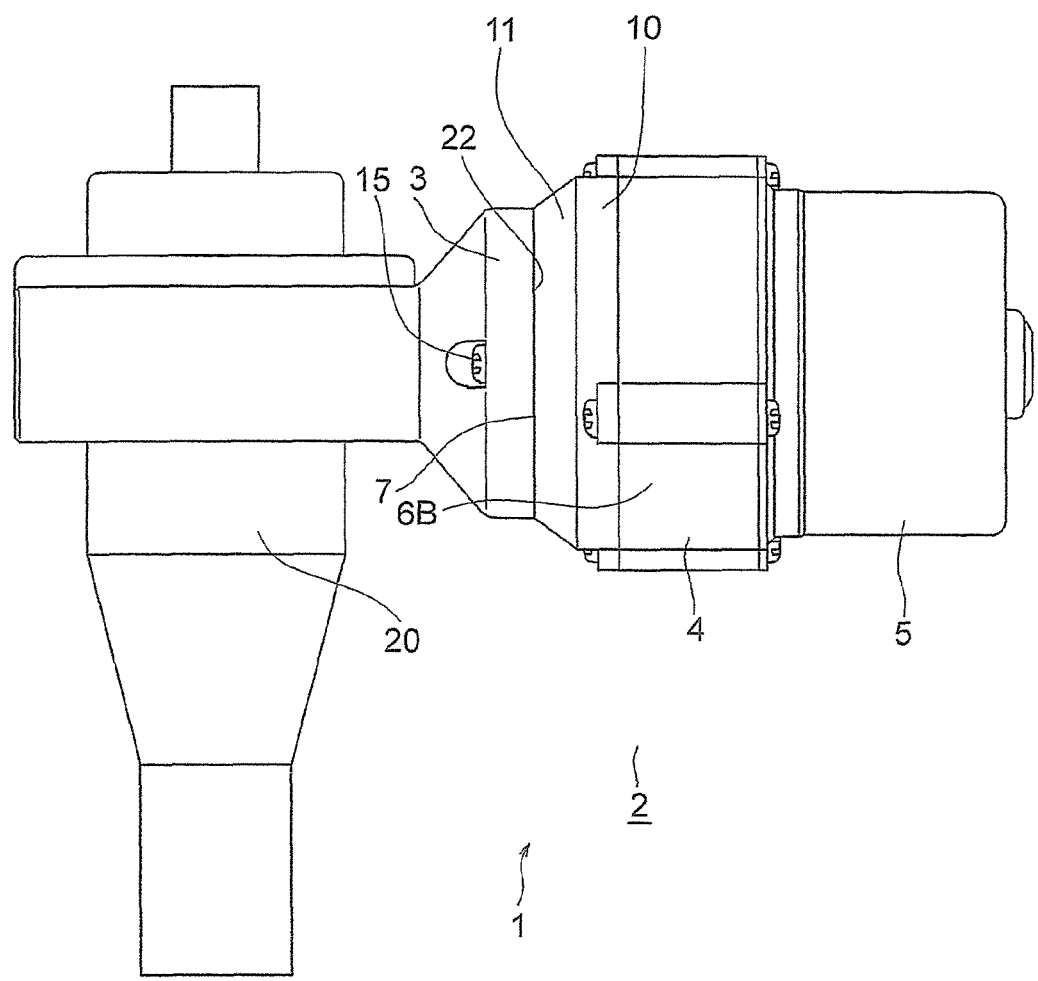
FIG. 6 is a top view of FIG. 5.
Figure 7:
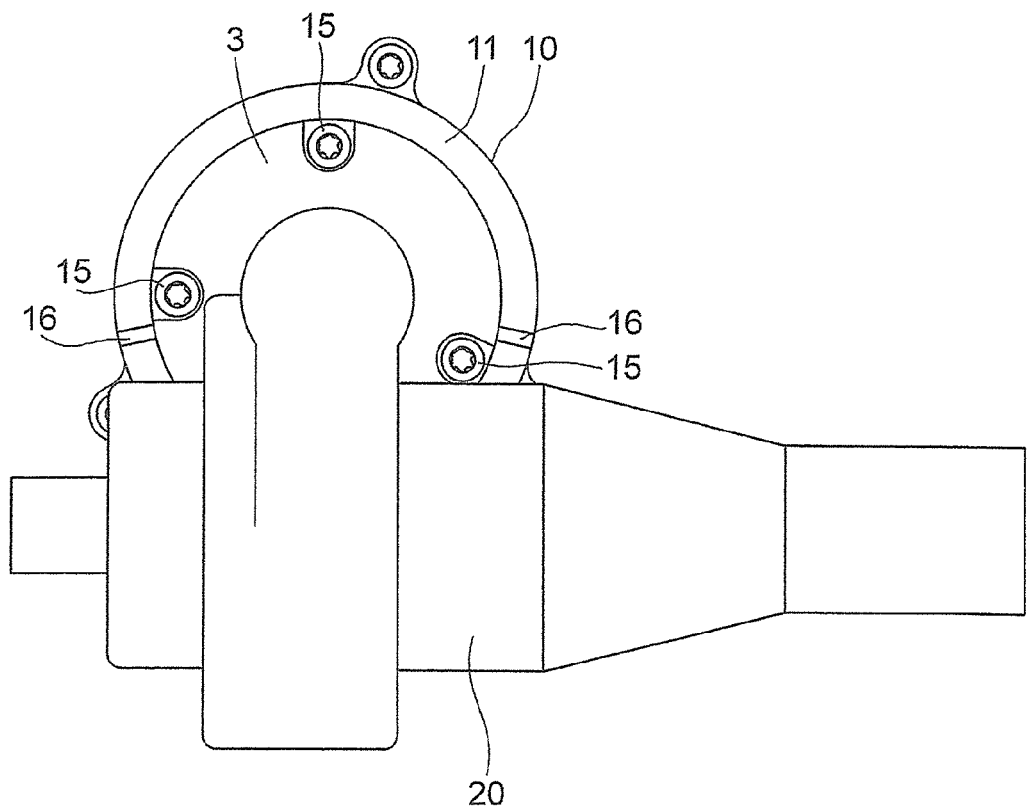
FIG. 7 is a front view of FIG. 5.
Figure 8:
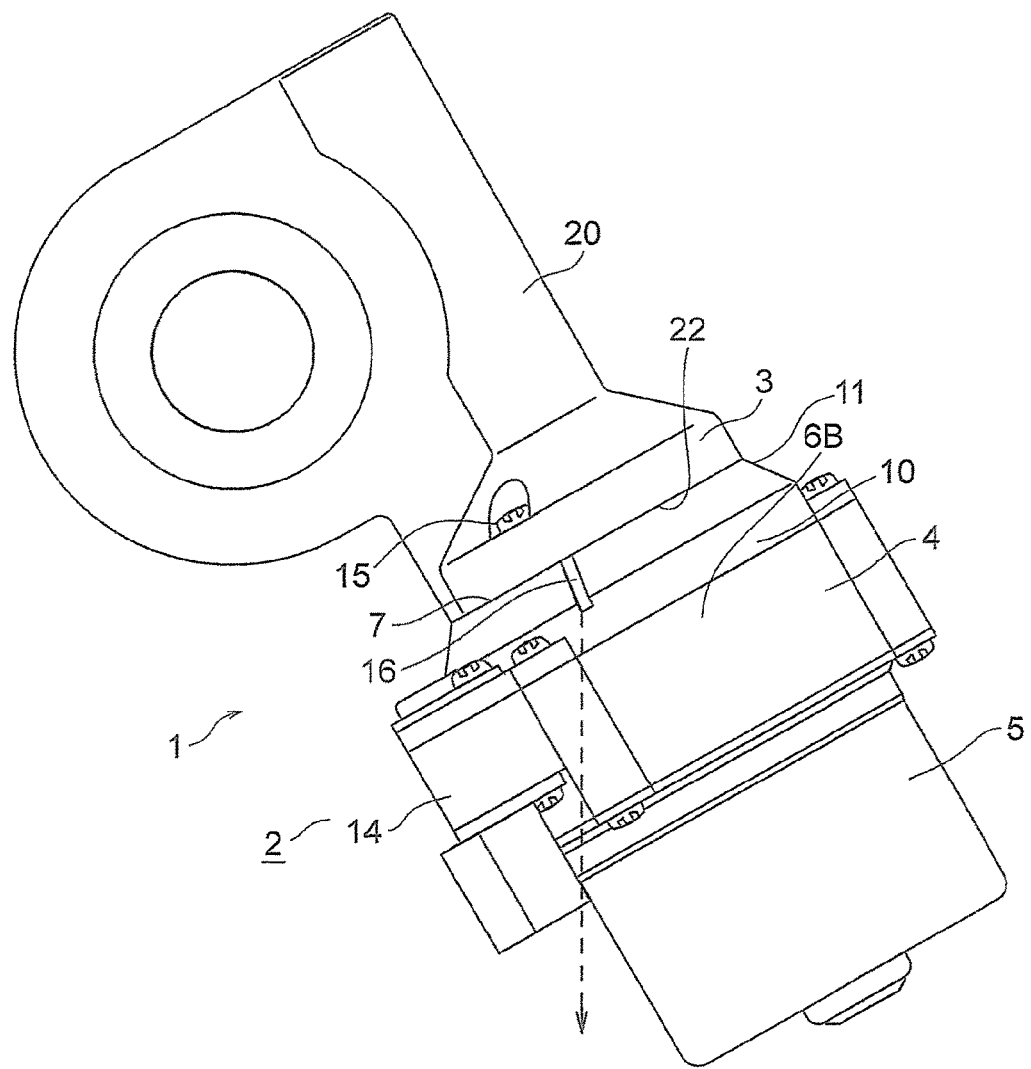
FIG. 8 is a side view illustrating a mounting angle formed when the electric power steering device 1 of FIG. 5 is mounted in a vehicle.

FIG. 5 is a side view illustrating the electric power steering device 1 according to a second embodiment of the present invention. FIG. 6 is a top view of FIG. 5. FIG. 7 is a front view of FIG. 5. FIG. 8 is a side view illustrating a mounting angle formed when the electric power steering device 1 of the present invention is mounted in a vehicle.

In this embodiment, a motor mounting surface 22 of the gear housing 3 and the mounting-portion contact surface 7 of a motor housing 6B are brought into abutment against each other. The motor 2 is fixed to the gear housing 3 on an inner side of the gear housing 3 closer to the outer diameter of the mounting-portion contact surface 7 by screws 15.

One end portion of the motor housing 6B includes the outer-diameter gradually increasing surface 11 having the outer diameter substantially matching with the outer diameter of the gear housing 3 on the mounting-portion contact surface 7 and gradually enlarges from the mounting-portion contact surface 7 toward the motor-housing outer circumferential surface 10.

On the outer-diameter gradually increasing surface 11, grooves 16, each having a depth increasing from the mounting-portion contact surface 7 toward the motor-housing outer circumferential surface 10, are formed.

Although the outer-diameter gradually increasing surface 11 has a tapered shape, the shape thereof may be a rounded shape enlarging in the radial direction or a shape similar thereto.

As can be seen from FIG. 8, when being mounted in the vehicle, the electric power steering device 1 is mounted so that the grooves 16 are located above the connector unit 14.

Further, the connector unit 14 is located away from a vertical line (indicated by the dotted line in FIG. 8) extended from a lower end of the grooves 16.

The remaining configuration is the same as that of the electric power steering device 1 according to the first embodiment.

In a state in which the electric power steering device configured as described above is mounted in the vehicle, a liquid substance such as rainwater or beverage dropping from above flows down along the outer-diameter gradually increasing surface 11 and the grooves 16 to flow out to the outside. Thus, the liquid substance does not accumulate on the mounting-portion contact surface 7 between the gear housing 3 and the motor housing 6B. Further, the liquid does not flow down onto the connector unit 14. Thus, the same effects as those obtained by the electric power steering device 1 according to the first embodiment can be obtained.

Third Embodiment

Figure 9:
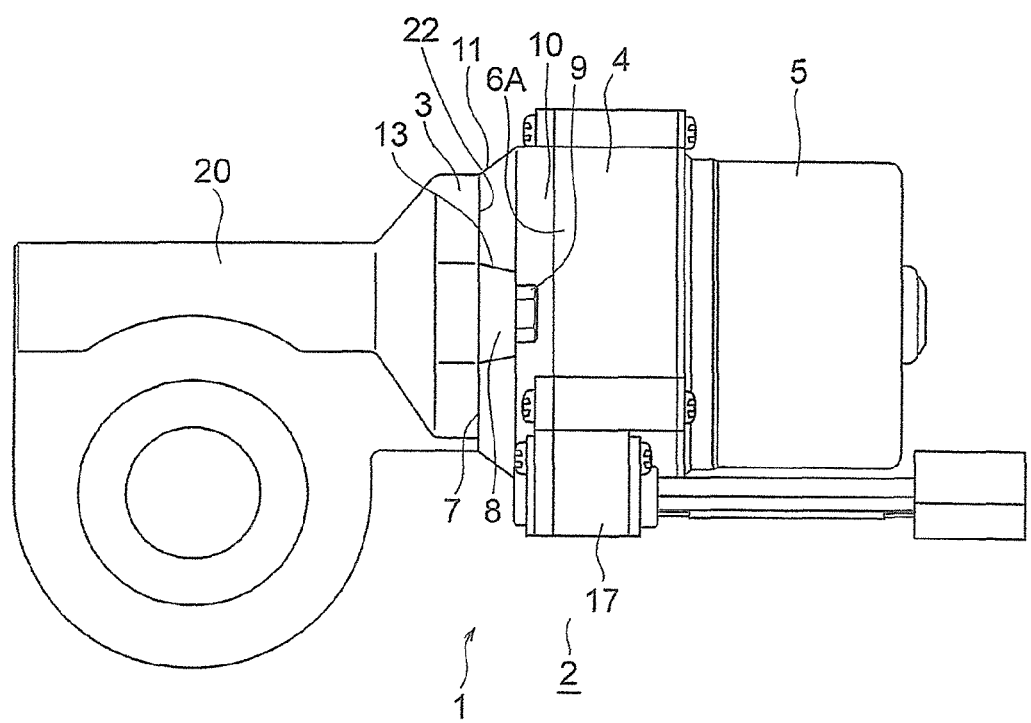
FIG. 9 is a side view illustrating the electric power steering device according to a first embodiment of the present invention.

FIG. 9 is a side view illustrating the electric power steering device 1 according to a third embodiment of the present invention.

In this embodiment, a harness lead-out unit 17 is used in place of the connector unit 14 in the driving control unit 4.

When being mounted in the vehicle, the electric power steering device 1 is mounted so that the mounting flanges 8 are located above the harness lead-out unit 17.

Further, at this time, the harness lead-out unit 17 falls within the orthographic projection area of the motor housing 6A.

Further, the harness lead-out unit 17 is located away from a vertical line extended from a lower end of the intersection portion 13.

The remaining configuration is the same as that of the electric power steering device 1 according to the first embodiment.

In a state in which the electric power steering device 1 configured as described above is mounted in the vehicle, a liquid substance such as rainwater or beverage dropping from above flows down along the outer-diameter gradually increasing surface 11 and the intersection portion 13 to flow out to the outside. Thus, the liquid does not accumulate on the mounting-portion contact surface 7 between the gear housing 3 and the motor housing 6A. Further, the liquid is kept away from the harness lead-out unit 17. Thus, the same effects as those obtained by the electric power steering device 1 according to the first embodiment can be obtained.

Further, even in the electric power steering device 1 according to the second embodiment, the harness lead-out unit 17 may be used in place of the connector unit 14.

Fourth Embodiment

Figure 10:
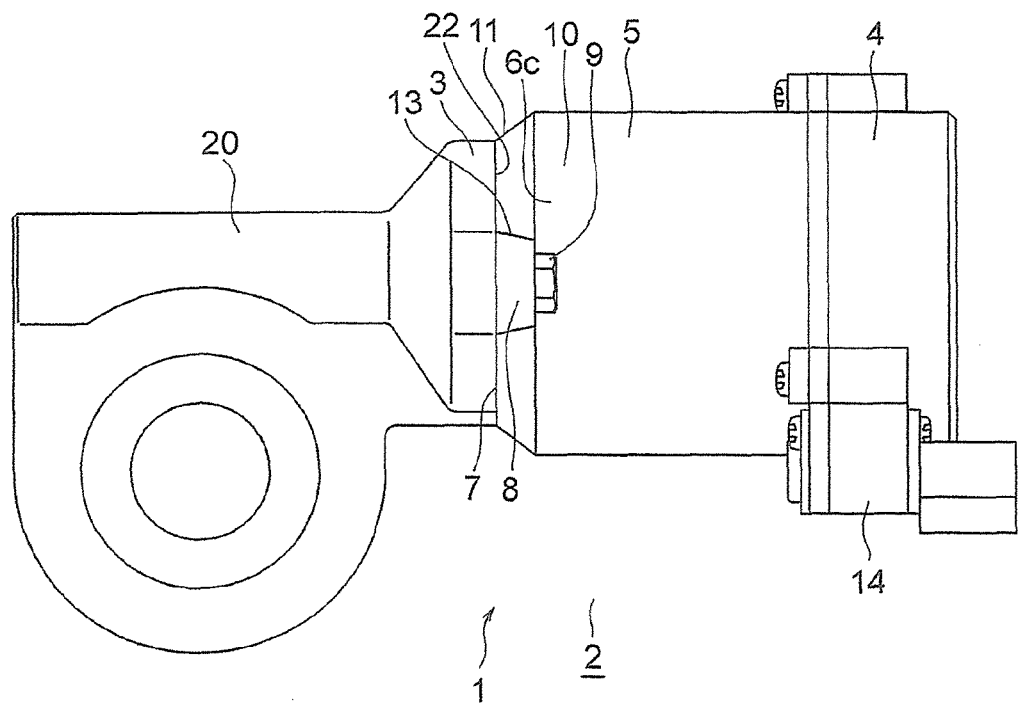
FIG. 10 is a side view illustrating the electric power steering device according to a first embodiment of the present invention.

FIG. 10 is a side view illustrating the electric power steering device 1 according to a fourth embodiment of the present invention.

In the electric power steering device 1 according to this embodiment, the driving control unit 4 and the motor unit 5 are arranged coaxially, whereas the driving control unit 4 is located adjacent to the motor unit 5 on a side opposite to the gearbox.

A motor housing 6C formed by aluminum die casting has a configuration that also serves as a frame for the motor unit 5.

One end portion of the motor housing 6C includes the outer-diameter gradually increasing surface 11 having the outer diameter substantially matching with the outer diameter of the gear housing 3 on the mounting-portion contact surface 7 and gradually enlarges from the mounting-portion contact surface 7 toward the motor-housing outer circumferential surface 10.

In a state in which the electric power steering device 1 configured as described above is mounted in the vehicle, a liquid such as rainwater or beverage dropping from above flows down along the outer-diameter gradually increasing surface 11 and the intersection portions 13 to flow out to the outside. Thus, the liquid does not accumulate on the mounting-portion contact surface 7 between the gear housing 3 and the motor housing 6C. Further, the liquid does not flow down onto the connector unit 14. Thus, the same effects as those obtained by the electric power steering device 1 according to the first embodiment can be obtained.

In this embodiment, the mounting flanges 8 are used as the wall portions and the wall surfaces 12 of the wall portions correspond to the side surfaces of the mounting flanges 8. Alternatively, radially projecting protrusions may be formed on the outer-diameter gradually increasing surface 11 and side surfaces of the protrusions may be used as wall surfaces so that the liquid flows down along intersection portions in which the wall surfaces and the outer-diameter gradually increasing surface 11 intersect.

Further alternatively, the grooves 16 similar to those of the second embodiment may be formed on the outer-diameter gradually increasing surface 11 without forming the wall portions.

Although the electric power steering device 1 including the motor unit 5 and the driving control unit 4 arranged coaxially and integrally has been described in each of the embodiments described above, it is needless to say that the present invention is not limited thereto. For example, the motor unit may be connected to the gearbox while the driving control unit may be installed in the motor unit, or the motor unit may be connected to the gearbox while the driving control unit may be individually separated from the motor unit.

REFERENCE SIGNS LIST 1 electric power steering device, 2 motor, 3 gear housing, 4 driving control unit, 5 motor unit, 6A, 6B, 6C motor housing, 7 mounting-portion contact surface, 8, 21 mounting flange, 9 mounting screw, 10 motor-housing outer circumferential surface, 11 outer-diameter gradually increasing surface, 12 wall surface, 13 intersection portion, 14 connector unit, 15 mounting screw, 16 groove, 17 harness lead-out unit, 20 steering column, 22 motor mounting surface

The invention claimed is:

1. An electric power steering device, comprising:
   a gearbox; and
   a driving control unit, which is coaxially connected to the gearbox through a mounting-portion contact surface corresponding to an end surface of the driving control unit, for controlling driving of a motor unit that is a steering assist force generation source,
   the driving control unit including an outer-diameter gradually increasing surface formed on one end portion thereof, the outer-diameter gradually increasing surface being connected so that an outer diameter thereof on the mounting-portion contact surface matches with an outer diameter of the gearbox and gradually enlarging along an axis direction.

2. An electric power steering device according to claim 1, wherein:
   the outer-diameter gradually increasing surface is formed on a motor housing that forms an outer wall for a motor including the motor unit and the driving control unit formed integrally, and the outer-diameter gradually increasing surface includes a radially projecting wall portion formed over an entire area of the outer-diameter gradually increasing surface in the axis direction; and
   when the electric power steering device is mounted in a vehicle, a liquid drops along an intersection portion in which the wall portion and the outer-diameter gradually increasing surface intersect.

3. An electric power steering device according to claim 2, wherein the wall portion comprises a mounting flange to be coupled to a mounting flange of the gearbox.

4. An electric power steering device according to claim 1, wherein:
the outer-diameter gradually increasing surface is formed on a motor housing that forms an outer wall for a motor including the motor unit and the driving control unit formed integrally, and the outer-diameter gradually increasing surface includes a groove formed over an entire area of the outer-diameter gradually increasing surface in the axis direction; and
when the electric power steering device is mounted in a vehicle, the liquid drops along the groove.

5. An electric power steering device according to claim 2, wherein:
the driving control unit comprises a connector unit or a harness lead-out unit to be electrically connected to an external wiring; and
when the electric power steering device is mounted in a vehicle, the connector unit or the harness lead-out unit is located below the intersection portion and falls within an orthographic projection area of the motor housing.

6. An electric power steering device according to claim 4, wherein:
the driving control unit comprises a connector unit or a harness lead-out unit to be electrically connected to an external wiring; and
when the electric power steering device is mounted in a vehicle, the connector unit or the harness lead-out unit is located below the groove and falls within an orthographic projection area of the motor housing.

7. An electric power steering device according to claim 1, wherein the outer-diameter gradually increasing surface comprises a tapered surface.

8. An electric power steering device according to claim 1, wherein the outer-diameter gradually increasing surface comprises a rounded surface with a radially enlarging intermediate portion.

9. An electric power steering device according to claim 1, wherein:
the driving control unit and the motor unit are arranged coaxially; and
the driving control unit is arranged adjacent to the motor unit on a side closer to the gearbox.

10. An electric power steering device, comprising:
a gearbox; and
a motor unit, which is coaxially connected to the gearbox through a mounting-portion contact surface corresponding to an end surface of the driving control unit, and is a steering assist force generation source,
the motor unit including an outer-diameter gradually increasing surface formed on one end portion thereof, the outer-diameter gradually increasing surface being connected so that an outer diameter thereof on the mounting-portion contact surface matches with an outer diameter of the gearbox and gradually enlarging along an axis direction.

11. An electric power steering device according to claim 10, wherein:
the driving control unit and the motor unit are arranged coaxially; and
the driving control unit is arranged adjacent to the motor unit on a side opposite to the gearbox.

* * * * *